United States Patent [19]
Kempken

[11] 3,762,196
[45] Oct. 2, 1973

[54] PIPE BENDING MACHINE

[76] Inventor: Dietrich Kempken, Am Buttendict 41, Wesel-Obrighoven, Germany

[22] Filed: July 26, 1971

[21] Appl. No.: 166,151

[30] Foreign Application Priority Data
July 29, 1970 Germany............... P 20 37 549.9

[52] U.S. Cl................ 72/12, 72/294, 72/DIG. 16, 72/DIG. 22
[51] Int. Cl............... B21b 37/00, B21d 43/28
[58] Field of Search................. 72/129, 203, 294, 72/334, 335, 7, 8, 9, 12, 14, 15, DIG. 4, DIG. 16, DIG. 22; 113/118 R; 29/157.3 R

[56] References Cited
UNITED STATES PATENTS
3,592,029   7/1971   Spellen .................. 72/7
R27,021   1/1971   Ott.......................... 72/7

Primary Examiner—Charles W. Lanham
Assistant Examiner—M. J. Keenan
Attorney—Allison C. Collard

[57] ABSTRACT

An electronically controlled, pipe bending machine for making a plurality of bends on individual segments of straight pipes which are welded together to form a coiled pipe assembly. The machine is provided with a carrier which measures the individual pipe shanks, grips the pipes, and moves each individual piece into the bending machine, where the pipes are bent. Alternate embodiments are disclosed.

8 Claims, 4 Drawing Figures

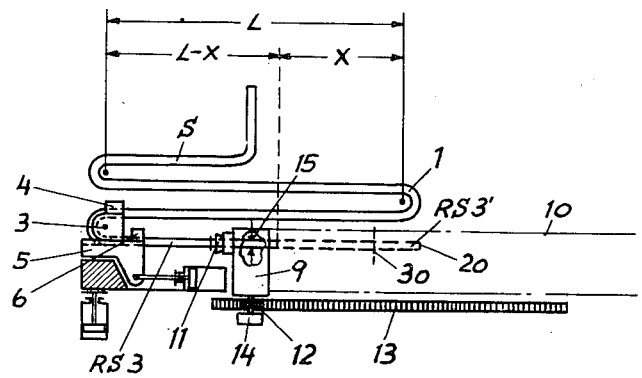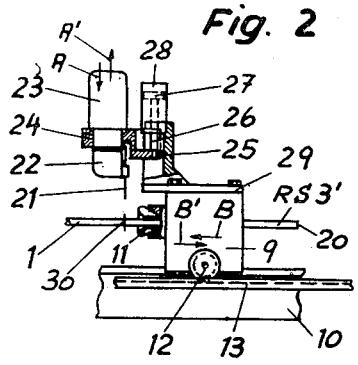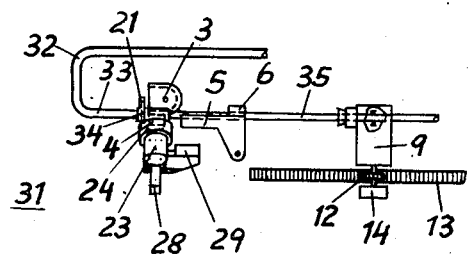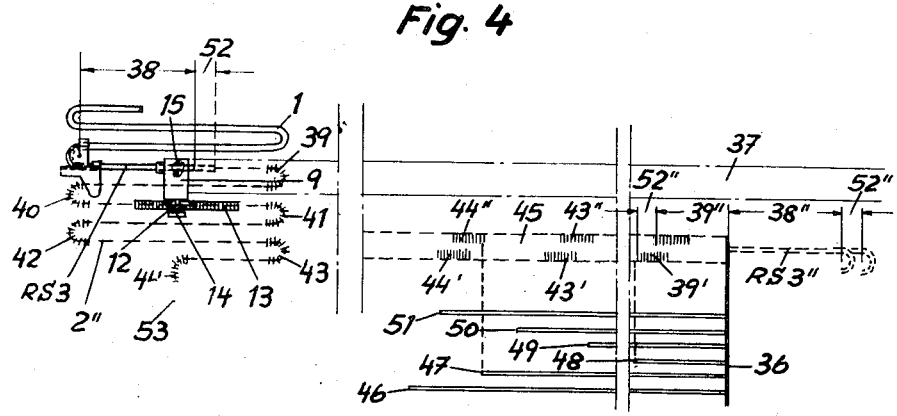

PIPE BENDING MACHINE

The present invention relates to pipe bending machines, and in particular to an electronically controlled pipe bending machine for making a plurality of bends on individual segments of straight pipe which are welded together to form a coiled pipe assembly. The machine is provided with a carrier which measures the individual pipe shanks, grips the pipe, and moves each individual piece into the pipe bending machine along a pre-programmed travel path. When the work piece is placed in the machine it is held in position by a gripping device so that the pipes may be bent. The pipe segments bent may be of any given length, and plurality of pipes of different lengths do not have to be pre-arranged, or shortened, for the machine to operate properly, since the carrier measuring device measures the length of the pipe shank which is gripped by the gripping device after the pipe has been bent in the machine. The travel path of the carrier, which is pre-programmed according to the total length of the next shank to be bent, is thus reduced by an amount equal to the length of the remaining portion of the shank. The reduced travel path of the carrier will then define the length of the leading shank portion of the next pipe to be bent. All the pipes which are thus bent may be welded together to form a coiled pipe assembly, notwithstanding the different lengths of their end shank portions.

During the bending operation, it often happens that a shank portion ends up in the subsequent bend. If this happens, the bending operation has to be stopped since various difficulties arise during the formation of the subsequent bend. Stationary cutting devices for cutting lengths of pipe and providing burrers for shortening the end shank portion of the bent pipe pieces are known. In conventional bending machines, each pipe has a predetermined length including an extra portion which can be cut off. Much material is wasted, however. Such a cutting device is not suitable for the bending machine of the present invention since the lengths of the pipe shanks vary in length. Thus, the point at which the end shank is cut off differs. Since the lengths of the end shanks in a group of coiled pipe assemblies are often even, the stationary cutting device may be used if an improvement is made so that the end shank may be cut off as close as possible to the last bend of the pipe assembly.

Accordingly, in the present invention, a cutting device is provided on the carrier which shortens the end shank at the desired point. Thus, the end shank is cut to an optimum length, and the remaining portion of the travel path is used for the following bending operation. Waste of material is thereby reduced. With the moveable cutting device of the present invention, even long end shanks can be shortened to the desired length. In such a case no waste occurs, since the severed pipe is used for the next pipe assembly.

Since the cutting operation is closely timed with the pipe bending operation, it is preferable to actuate the cutting device hydraulically by an electronic control. And since the length of the end shank of the pipe assembly is not affected by the length of the lead shank for the following pipe assembly, the end shank may be cut short if an additional cutting means is located at the discharge end of the machine. During operation, the end shank is moved a short distance and is gripped by the gripping device of the machine. Thereafter, it is cut outside of the pipe bending area of the machine. This eliminates waste, since the severed pipe piece remains in the pipe bending machine to be used as the lead pipe piece for the following pipe assembly.

In another embodiment of the invention, the length of the end shank serves as a starting point for the transmission of an intermediate operation with which the length of the following pipe piece is compared. From the starting point, an electronic control sends the pipe bending apparatus to the feeding station for the pipe pieces, instead of introducing them directly into the pipe bending machine. In this embodiment, the starting points are marked on the pipes where the pipes should bend. In order to work the first pipe piece, a transmission of the starting point is not required. The starting point may be marked by light, so that an optical comparison is readily available. The optical comparison will determine whether the following pipe may be placed in position, or a new sequence will be required.

Conventional key levers, induction coils, light sensitive electric cells, or the like, may be used to scan the pipe pieces and determine whether the pipe ends near the starting points. A plurality of scanning means may be used and arranged stationary on the pipe bending machine. A single scanning means, guided along the pipe pieces, may also be used. It is also possible to use a stationary scanning device, wherein the pipe pieces are moved along the scanning means by a stroke motion, and the pipe is checked at the points where the bending operation is to take place. The movement of the first pipe piece of a pipe assembly and the length of the pipe bend determine the point at which the pipe will end and the length of the end shank. In order to measure the length of the end shank, a longitudinal measurement device is necessary. A movable measuring device is preferable and is mounted in the machine so as to move with respect to the pipe pieces. The device is coupled to a key lever means. With such a measuring device, the starting point for the transmission of the intermediate program can be affected. It is therefore possible to determine beforehand the different lengths of pipe which are needed for one coiled pipe assembly. However, any piece of pipe, which remains after the bending operation is terminated, must be sequenced into the pre-planning of the series of pipe pieces for the following coiled pipe assembly. The pipes may be welded together to form a straight line before the bending operation in order to more easily control the clearance between two adjacent pipes at their welding points.

It is therefore an object of the present invention to provide a pipe bending machine for fabricating coiled pipe assemblies from a plurality of individual straight pipes in which the end shank of a pipe is positioned so as to terminate within the range of a following bend, and in which the pipes are cut with the least amount of waste possible.

It is also an object of the present invention to provide a pipe bending machine which is simple in design, easy to manufacture, and efficient and reliable in operation.

Other objects and features of the present invention will become apparant from the following detailed description taken in connection with the accompanying drawings which disclose several embodiments of the invention. It is to be understood, however, that the drawings are intended for the purposes of illustration only, and not as a definition of the limits and scope of the invention.

In the drawings, wherein similar reference numerals denote similar elements throughout the several views.

FIG. 1 is a partial, plan view of a pipe bending machine constructed in accordance with the present invention;

FIG. 2 is an enlarged view of the pipe carrier of the embodiment shown in FIG. 1;

FIG. 3 is a partial view of the pipe bending machine of FIG. 1 in which the end pipe of the pipe assembly has shorter bend flanges than those shown in FIG. 1; and FIG. 4 is another embodiment of a pipe bending machine constructed in accordance with the present invention.

Referring to the drawings, a pipe bending station 3 and a clamping device 4 are provided on a bending machine 5. A work piece gripping device 6 is also provided on the pipe bending machine for gripping the pipe pieces. The pipe carrier 9 is moveably mounted on machine support 10 and, is also provided with a pipe gripping device 11 and a stroke or pipe travel measuring means 12, 13, 14 and 15. The stroke of carrier 9 determines the shank length L of the coiled pipe assembly, and length L of shank portion S may vary in a given coiled pipe assembly. The remainder of the shank length, $RS3' = L - X$, of pipe segment 1 is measured by measuring meas 12, 13, 14 and 15. The beginning stroke of carrier 9 is affected by this measured valve, so that for the following beginning shank, the reduced stroke X is carried out by carrier 9. The stroke and bending operations are controlled by an electronic control (not shown).

When using straight pipes of different lengths and in a chosen sequence, it is possible that end portion 20 of a remaining shank RS3' may be positioned in the range of the next bending operation. In order to be able to shorten the shank RS3' with the least amount of waste, and so that the next stroke X is measured correctly, a cutting device is mounted on carrier 9. The cutting device is hydraulically actuated by the electronic control device.

As shown in detail in FIG. 2, a cutting means 21, such as a cutting disc, saw, or the like, is driven by an angular drive 22 and an electric motor. This unit is mounted and retained by a clamp ring 24 having a shoulder 25. A piston 27 is provided with a rod 26 mounted on shoulder 25, and is mounted within the hydraulic pressure cylinder 28. The plate of an angle bracket 29 is mounted on the carrier 9 for securing pressure cylinder 28. Ring 24 is provided with two straps (not shown) which engage grooves provided in the vertical portions of bracket 29, so that cutting means 21 can be moved upwardly and downwardly in the directions of the arrows A and A'.

When end portion 20 of shank portion RS3' falls into the bending range of the following pipe bend (as shown in FIG. 1), the remainder of the shank portion must be shortened. This is accomplished by clamping pipe 1 in the bending station while clamping jacket 11 is loosened. Carrier 9 is then moved along machine support 10 in the direction of arrows B or B' until cutting means 21 is located in the desired position 30, which is defined exactly by measuring devices 12 and 13. Jacket 11 is then tensioned and cutting device 21 actuated by rapidly moving the cutting device by piston 27 to pipe 1. The cutting device will then slowly cut the pipe.

After rapidly lifting cutting means 21 in the direction of arrow A', jacket 11 is loosened and the severed piece of shank RS3' can be removed from the pipe bending machine. Pipe 1 remains in the bending station until the new length of the remaining shank portion has been measured, in order to affect the stroke for the lead shank length of the following piece of pipe. For greater precision in cutting the short end shank an additional cutting means may be provided on the outer side of the discharge opening 31. Such a cutting device should be stationary so that cutting device 21 is located outside of pipe bending machine 3, and is actuated in the same manner as device 21. After the last pipe 32 of the coiled pipe assembly has been pushed forward into the pipe bending machine according to the length of end shank portion 33, and has been clamped in gripping device 4, the end shank is cut. The severed piece of pipe 35 remains in the pipe bending machine and is used for the following coiled pipe assembly so as to reduce waste.

As shown in FIG. 4, pipe 1 has a shank RS3. The lengths of the remaining shanks are measured by measuring means 12, 13, 14 and 15, and the measured value transmitted to a defined line 36 before positioning the following piece of pipe in the pipe bending machine. Line 36 should be close to the pipe feeding station 37 of the pipe bending machine. The length 38 of the remaining shank RS3 is indicated as length 38'' and is connected to line 36 and has a remaining shank portion RS3''. The bending operation for the following pipe pieces is indicated by hatched line 2'', and hatched lines 39–44 indicate the points where bending is essential for the following pipe pieces. Hatched lines 39–44 also indicate the places where the pipe pieces should not end. Instead of carrying out this type of pipe bending operation, the operation is transmitted as an intermediate operation by an electronic control device (not shown) from line 36 to a device 45 at which points 39–44 are indicated as points 39' to 44'.

The pipe pieces, which are of different lengths 46 to 51, are aligned with their opposite ends at line 36. When feeding the pipe pieces into the pipe bending machine, ends 46–51 are compared with points 39'–44' to determine if the pipe pieces with ends 46, 47, 48, 49, and 50 can be fed into the pipe bending machine for the following bending operation. However, the pipe piece having end 51 is not suitable for the following bending operation, since the end would fall into the bending range 44. If the remaining shank RS3 would have been a little longer, as indicated by 52, then the designated points 39'' to 44'' would be displaced by length 52'', which is equal to length 52. This would mean, that the pipes having ends 46, 48, and 50 could be fed into the pipe bending machine, while the pipes with ends 47 or 49 would not be suitable as the following pipe piece. And although the pipe with end 51 could be bent perfectly, the end shank would be too short.

While only several embodiments of the present invention have been shown and described, it will be understood by those persons skilled in the art that many changes and modifications may be made thereunto without departing from the spirit and scope of the invention.

What is claimed is:

1. An electronically controlled pipe bending machine for bending a plurality of straight pipes that are welded together to form a coiled pipe assembly comprising in combination:

movable carrier means for carrying the straight pipe pieces;

means coupled to said movable carrier means for measuring the distance traversed by said movable carrier means and the length of the straight pipes;

means for gripping the pipes to be bent and mounted on said movable carrier means;

means mounted on said movable carrier means and acting in cooperation with said measuring means for cutting the trailing end portions of the pipes at selected points along their lengths so that the end portions will not be a part of the subsequent bends in the pipe; and means for bending the pipes at selected points along their lengths so that the measured length of the remaining pipe shank of a bent pipe determines the length of the lead shank of the next pipe to be bent before the first bend therein.

2. The pipe bending machine as recited in claim 1, wherein said cutting means is actuated hydraulically by an electronic control means.

3. The pipe bending machine as recited in claim 2 further comprising a second cutting means mounted adjacent said pipe bending means on the pipe bending machine at the discharge end thereof for more precisely cutting the short ends of the pipes to be bent.

4. The pipe bending machine as recited in claim 3, wherein said gripping means grips said pipes during said pipe bending operation and said cutting operation.

5. The pipe bending machine as recited in claim 1, wherein the measured length of said remaining shank portion affects the starting point of an intermediate program transmission which indicates the places at the feed station of said pipe bending machine at which the pipe pieces enter into said pipe bending means.

6. The pipe bending machine as recited in claim 5 further comprising a plurality of movably mounted scanning means for scanning said pipes and controlling the drive of said pipe bending machine.

7. The pipe bending machine as recited in claim 6, wherein a longitudinal measuring device for measuring the length of said pipe pieces is coupled to said movable scanning means.

8. The pipe bending machine as recited in claim 7, wherein said straight pipe pieces bent to form said coiled pipe assembly are welded together before being placed into said pipe bending machine.

* * * * *